(12) United States Patent
Kawabata

(10) Patent No.: US 11,210,926 B2
(45) Date of Patent: Dec. 28, 2021

(54) MANAGEMENT DEVICE, MANAGEMENT SYSTEM, MANAGEMENT METHOD AND MANAGEMENT PROGRAM

(71) Applicant: SUMITOMO ELECTRIC INDUSTRIES, LTD., Osaka (JP)

(72) Inventor: Hideaki Kawabata, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/628,212

(22) PCT Filed: Apr. 27, 2018

(86) PCT No.: PCT/JP2018/017168
§ 371 (c)(1),
(2) Date: Jan. 2, 2020

(87) PCT Pub. No.: WO2019/021562
PCT Pub. Date: Jan. 31, 2019

(65) Prior Publication Data
US 2020/0380850 A1 Dec. 3, 2020

(30) Foreign Application Priority Data
Jul. 28, 2017 (JP) ............................. JP2017-146511

(51) Int. Cl.
G08B 23/00 (2006.01)
G06T 11/00 (2006.01)
H04Q 9/00 (2006.01)

(52) U.S. Cl.
CPC ............ G08B 23/00 (2013.01); G06T 11/001 (2013.01); H04Q 9/00 (2013.01); *H04Q 2213/002* (2013.01)

(58) Field of Classification Search
CPC .......... G08B 23/00; G06T 11/01; H04Q 9/00; H04Q 2213/002

USPC ......................................................... 345/593
See application file for complete search history.

(56) References Cited

U.S. PATENT DOCUMENTS

| | | | |
|---|---|---|---|
| 2008/0219210 A1* | 9/2008 | Shuey | G01D 4/006 370/329 |
| 2012/0192113 A1* | 7/2012 | Higuchi | G06F 3/0488 715/835 |
| 2015/0339594 A1* | 11/2015 | Gallo | G06F 16/29 705/5 |

FOREIGN PATENT DOCUMENTS

| | | |
|---|---|---|
| JP | H05-33296 U | 4/1993 |
| JP | H11-224108 A | 8/1999 |
| JP | 2002-202804 A | 7/2002 |
| JP | 2006-163517 A | 6/2006 |

* cited by examiner

*Primary Examiner* — Hai Tao Sun
(74) *Attorney, Agent, or Firm* — Oliff PLC

(57) ABSTRACT

This management device includes: an acquisition unit configured to acquire, from one or a plurality of wireless terminal devices each having a plurality of contacts, state information indicating a state of each contact; and a display processing unit configured to perform, on the basis of the state information acquired by the acquisition unit, a process of displaying a representative icon representing each wireless terminal device. A possible state of the contact is any one of "closed", "open", and "unconnected". The display processing unit sets a display mode of the representative icon in accordance with a priority of the state of the contact.

13 Claims, 10 Drawing Sheets

FIG. 5

| PATTERN | PATTERN 1 | PATTERN 2 | PATTERN 3 | PATTERN 4 | PATTERN 5 |
|---|---|---|---|---|---|
| REPRESEN-TATIVE ICON AND CONTACT ICON | | | | | |
| APPARATUS STATUS | APPARATUS X OUTPUTS WARNING, ABNORMALITY, WORK REQUEST, AND OPERATION STOP SIGNALS. | APPARATUS X OUTPUTS ABNORMALITY, WORK REQUEST, AND OPERATION STOP SIGNALS. | APPARATUS X OUTPUTS WORK REQUEST, AND OPERATION STOP SIGNALS. | APPARATUS X OUTPUTS OPERATION STOP SIGNAL. | APPARATUS X DOES NOT OUTPUT SIGNAL (OPERATING NORMALLY). |
| LIGHTING STATUS | | | | | |

FIG. 7

| PATTERN | PATTERN 1 | | PATTERN 2 | | PATTERN 3 | | PATTERN 4 | | PATTERN 5 | |
|---|---|---|---|---|---|---|---|---|---|---|
| REPRESEN-TATIVE ICON AND CONTACT ICON | WIRELESS TERMINAL DEVICE 102A | WIRELESS TERMINAL DEVICE 102B | WIRELESS TERMINAL DEVICE 102A | WIRELESS TERMINAL DEVICE 102B | WIRELESS TERMINAL DEVICE 102A | WIRELESS TERMINAL DEVICE 102B | WIRELESS TERMINAL DEVICE 102A | WIRELESS TERMINAL DEVICE 102B | WIRELESS TERMINAL DEVICE 102A | WIRELESS TERMINAL DEVICE 102B |
| APPARATUS STATUS | APPARATUS X OUTPUTS WARNING, AND ABNORMALITY SIGNALS. | APPARATUS X OUTPUTS OPERATION STOP SIGNAL. | APPARATUS X OUTPUTS ABNORMALITY, WORK REQUEST, AND OPERATION STOP SIGNALS. | APPARATUS X OUTPUTS WORK REQUEST, AND OPERATION STOP SIGNALS. | APPARATUS X OUTPUTS OPERATION STOP SIGNAL. | APPARATUS X DOES NOT OUTPUT SIGNAL (OPERATING NORMALLY). | APPARATUS X DOES NOT OUTPUT SIGNAL (OPERATING NORMALLY). | APPARATUS X OUTPUTS WORK REQUEST, AND OPERATION STOP SIGNALS. | APPARATUS X DOES NOT OUTPUT SIGNAL (OPERATING NORMALLY). | APPARATUS X DOES NOT OUTPUT SIGNAL (OPERATING NORMALLY). |
| LIGHTING STATUS | | | | | | | | | | |

FIG. 8

| PATTERN | PATTERN 1 | | PATTERN 2 | | PATTERN 3 | | PATTERN 4 | |
|---|---|---|---|---|---|---|---|---|
| REPRESENTATIVE ICON AND CONTACT ICON | WIRELESS TERMINAL DEVICE 102A | WIRELESS TERMINAL DEVICE 102C | WIRELESS TERMINAL DEVICE 102D | WIRELESS TERMINAL DEVICE 102E | WIRELESS TERMINAL DEVICE 102A | WIRELESS TERMINAL DEVICE 102B | WIRELESS TERMINAL DEVICE 102D | WIRELESS TERMINAL DEVICE 102E |
| APPARATUS STATUS | APPARATUS X OUTPUTS WARNING, AND ABNORMALITY SIGNALS. | APPARATUS X OUTPUTS ABNORMALITY, WORK REQUEST, AND OPERATION STOP SIGNALS. | APPARATUS X OUTPUTS WORK REQUEST, AND OPERATION STOP SIGNALS. | APPARATUS X DOES NOT OUTPUT SIGNAL (OPERATING NORMALLY). | APPARATUS X OUTPUTS OPERATION STOP SIGNAL. | APPARATUS X OUTPUTS WORK REQUEST, AND OPERATION STOP SIGNALS. | APPARATUS X DOES NOT OUTPUT SIGNAL (OPERATING NORMALLY). | APPARATUS X OUTPUTS ABNORMALITY, WORK REQUEST, AND OPERATION STOP SIGNALS. |
| LIGHTING STATUS | 131A | | 131B | | 131A | | 131B | |

| PATTERN | PATTERN 1 | | PATTERN 2 | | PATTERN 3 | | PATTERN 4 | |
|---|---|---|---|---|---|---|---|---|
| REPRESEN- TATIVE ICON AND CONTACT ICON | WIRELESS TERMINAL DEVICE 102A | WIRELESS TERMINAL DEVICE 102C | WIRELESS TERMINAL DEVICE 102D | WIRELESS TERMINAL DEVICE 102E | WIRELESS TERMINAL DEVICE 102A | WIRELESS TERMINAL DEVICE 102B | WIRELESS TERMINAL DEVICE 102D | WIRELESS TERMINAL DEVICE 102E |
| APPARATUS STATUS | APPARATUS X OUTPUTS WARNING AND ABNORMALITY SIGNALS. | APPARATUS X OUTPUTS OPERATION STOP SIGNAL. | APPARATUS X OUTPUTS WORK REQUEST, AND OPERATION STOP SIGNALS. | APPARATUS X DOES NOT OUTPUT SIGNAL (OPERATING NORMALLY). | APPARATUS X OUTPUTS OPERATION STOP SIGNAL. | APPARATUS X OUTPUTS WORK REQUEST, AND OPERATION STOP SIGNALS. | APPARATUS X OUTPUTS WARNING, AND ABNORMALITY SIGNALS. | APPARATUS X OUTPUTS ABNORMALITY, WORK REQUEST, AND OPERATION STOP SIGNALS. |
| LIGHTING STATUS | 131A | | 131B | | 131A | | 131B | |

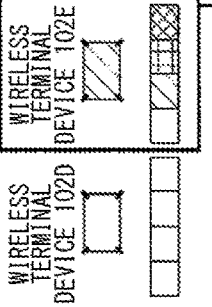

MANAGEMENT DEVICE, MANAGEMENT SYSTEM, MANAGEMENT METHOD AND MANAGEMENT PROGRAM

TECHNICAL FIELD

The present invention relates to a management device, a management system, a management method, and a management program.

This application claims priority on Japanese Patent Application No. 2017-146511 filed on Jul. 28, 2017, the entire content of which is incorporated herein by reference.

BACKGROUND ART

Japanese Laid-Open Patent Publication No. 2006-163517 (PATENT LITERATURE 1) discloses an abnormality detector as described below. That is, the abnormality detector is an abnormality detector that includes: a detection means provided to an object to be monitored; and a calculation means that diagnoses the state of the object to be monitored, through a neural network on the basis of detection data from the detection means, wherein the calculation means forms a model of the neural network by use of a predetermined model creation data, diagnoses the state of the object to be monitored, on the basis of the detection data by use of the model of the neural network, adds as an intermediate layer an input vector based on the detection data at a predetermined time point to update the model of the neural network, and after the update, diagnoses the state of the object to be monitored, by use of the updated model of the neural network.

CITATION LIST

Patent Literature

PATENT LITERATURE 1: Japanese Laid-Open Patent Publication No. 2006-163517

SUMMARY OF INVENTION

A management device of the present disclosure includes: an acquisition unit configured to acquire, from one or a plurality of wireless terminal devices each having a plurality of contacts, state information indicating a state of each contact; and a display processing unit configured to perform, on the basis of the state information acquired by the acquisition unit, a process of displaying a representative icon representing each wireless terminal device. A possible state of the contact is any one of "closed", "open", and "unconnected". The display processing unit sets a display mode of the representative icon in accordance with a priority of the state of the contact.

A management system of the present disclosure includes: one or a plurality of wireless terminal devices each having a plurality of contacts, and each being configured to transmit state information indicating a state of each contact; and a management device configured to receive the state information transmitted from each wireless terminal device, and to perform, on the basis of the received state information, a process of displaying a representative icon representing the wireless terminal device. A possible state of the contact is any one of "closed", "open", and "unconnected". The management device sets a display mode of the representative icon in accordance with a priority of the state of the contact.

A management method of the present disclosure is to be performed in a management device. The management method includes the steps of: acquiring, from one or a plurality of wireless terminal devices each having a plurality of contacts, state information indicating a state of each contact; and performing, on the basis of the acquired state information, a process of displaying a representative icon representing each wireless terminal device. A possible state of the contact is any one of "closed", "open", and "unconnected". In the step of performing the process of displaying the representative icon, a display mode of the representative icon is set in accordance with a priority of the state of the contact.

A management program of the present disclosure is to be used in a management device. The management program causes a computer to function as: an acquisition unit configured to acquire, from one or a plurality of wireless terminal devices each having a plurality of contacts, state information indicating a state of each contact; and a display processing unit configured to perform, on the basis of the state information acquired by the acquisition unit, a process of displaying a representative icon representing each wireless terminal device. A possible state of the contact is any one of "closed", "open", and "unconnected". The display processing unit sets a display mode of the representative icon in accordance with a priority of the state of the contact.

One mode of the present disclosure can be realized not only as a management device that includes such a characteristic processing unit, but also as a semiconductor integrated circuit that realizes part or the entirety of the management device.

In addition, one mode of the present disclosure can be realized not only as a management system that includes such a characteristic processing unit, but also as a management method that includes such characteristic process steps, or as a program for causing a computer to execute the steps.

BRIEF DESCRIPTION OF DRAWINGS

FIG. 5 shows one example of a lighting pattern of an alarm lamp controlled by the management device according to the embodiment of the present disclosure.

FIG. 7 shows Modification 1 of the lighting pattern of the alarm lamp controlled by the management device according to the embodiment of the present disclosure.

FIG. 8 shows Modification 2 of the lighting pattern of the alarm lamp controlled by the management device according to the embodiment of the present disclosure.

FIG. 9 shows Modification 3 of the lighting pattern of the alarm lamp controlled by the management device according to the embodiment of the present disclosure.

FIG. 10 shows Modification 4 of the lighting pattern of the alarm lamp controlled by the management device according to the embodiment of the present disclosure.

DESCRIPTION OF EMBODIMENTS

Figure 1:
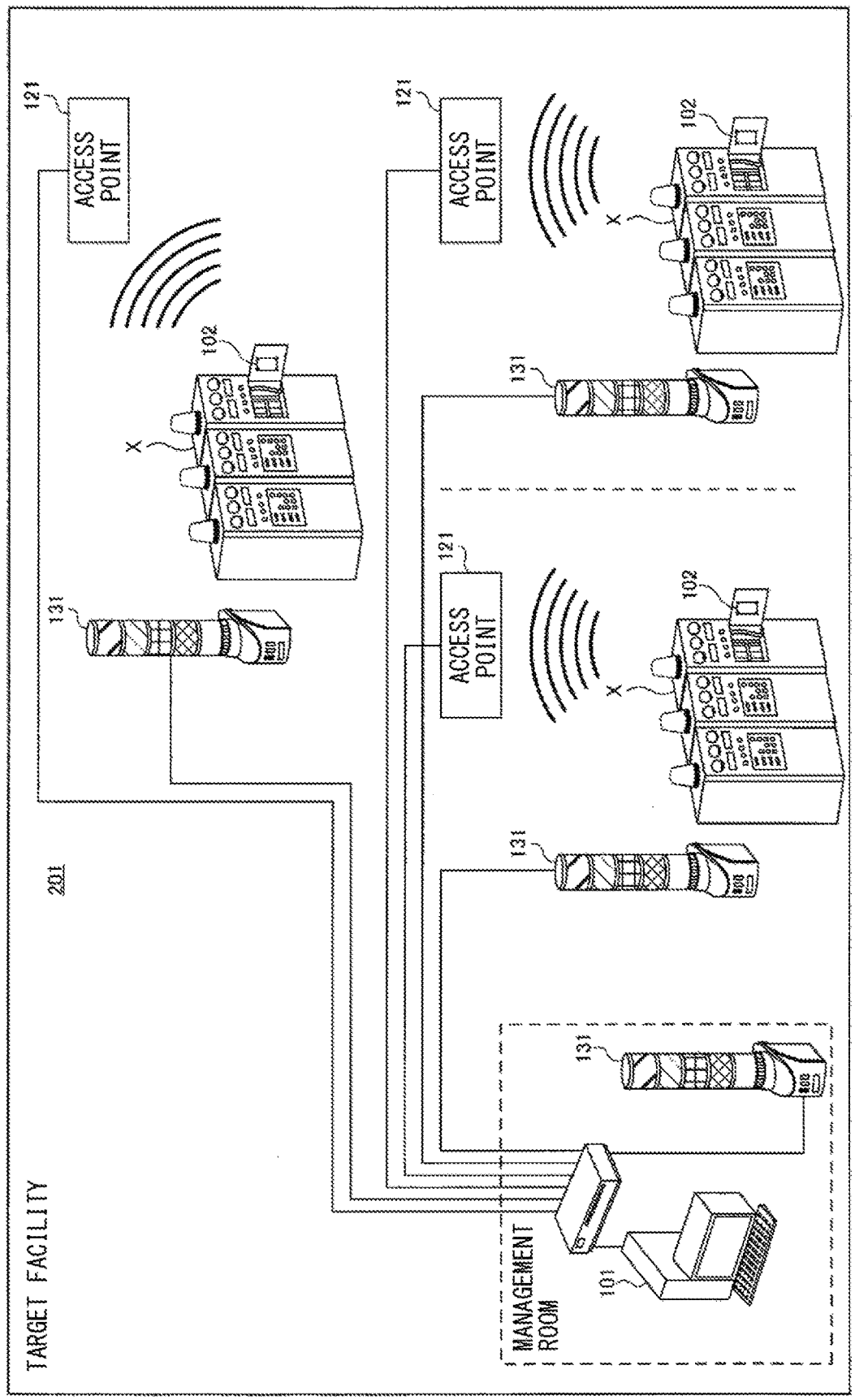
FIG. 1 shows a configuration of a management system according to an embodiment of the present disclosure.

To date, devices for monitoring facilities and the like provided in plants have been developed.

Problem to be Solved by the Present Disclosure

According to the device as described in PATENT LITERATURE 1 above, an abnormality that has occurred in an apparatus can be detected without using manpower. In addition, by a detection result being displayed on a screen, a supervisor can easily and visually understand the abnormality in the apparatus.

However, in an apparatus to be monitored, a plurality of states are sometimes present, such as when an abnormality has occurred for a certain function but another function is operating normally. In such a case, for example, if a display region on a screen is limited, it is difficult to appropriately understand the status of the apparatus.

The present disclosure has been made in order to solve the above problem. An objective of the present disclosure is to provide a management device, a management system, a management method, and a management program that allow, when a plurality of states have occurred in an apparatus to be monitored, appropriate understanding of the status of the apparatus.

Effect of the Present Disclosure

According to the present disclosure, when a plurality of states have occurred in an apparatus to be monitored, the status of the apparatus can be more appropriately understood.

Description of Embodiment of the Present Disclosure

First, contents of embodiments of the present disclosure are listed and described.

A management device according to an embodiment of the present disclosure includes: an acquisition unit configured to acquire, from one or a plurality of wireless terminal devices each having a plurality of contacts, state information indicating a state of each contact; and a display processing unit configured to perform, on the basis of the state information acquired by the acquisition unit, a process of displaying a representative icon representing each wireless terminal device. A possible state of the contact is any one of "closed", "open", and "unconnected". The display processing unit sets a display mode of the representative icon in accordance with a priority of the state of the contact.

Due to this configuration, even when the respective states of the plurality of contacts are different, the representative icon is displayed in a mode that corresponds to a state having a high priority.

That is, if a plurality of states of the apparatus are respectively associated with the states of a plurality of contacts, it is possible to display the representative icon in a mode according to a state having a high priority that a supervisor should be notified of, among the plurality of states of the apparatus. Therefore, when a plurality of states have occurred in an apparatus to be monitored, the status of the apparatus can be more appropriately understood.

(2) Preferably, each contact is provided with a priority, and the display processing unit sets the display mode of the representative icon in accordance with the priority of the state of the contact and the priority of the contact.

Due to this configuration, even when there are a plurality of contacts that are in the same state, the representative icon is displayed in a mode that corresponds to a contact that has a high priority among the plurality of contacts. Accordingly, for example, even when a plurality of abnormalities of different types have occurred in the apparatus, it is possible to notify the supervisor of the state having a high priority that should be notified of to the supervisor.

Preferably, the display processing unit performs a process of displaying, together with the representative icon, a contact icon in a mode indicating the state of each contact.

Due to this configuration, since information that is not indicated by the representative icon can be notified of by the contact icon, it is possible to notify the supervisor of the specific state of the apparatus.

Preferably, the display processing unit sets a color of the representative icon in accordance with the priority of the state of the contact.

Due to this configuration, by use of the display color of the icon, the supervisor can more appropriately understand the status of the apparatus.

More preferably, the display processing unit performs the process of displaying the contact icon when a predetermined operation has been performed on the representative icon.

Due to this configuration, for example, the contact icon that corresponds only to the apparatus selected by the supervisor can be displayed, and thus, the display of the screen can be prevented from being complicated.

Preferably, the management device further includes an output controller configured to perform, on the basis of the state information acquired by the acquisition unit, an output control of controlling an output content of an output device associated with a corresponding one of the wireless terminal devices.

Due to this configuration, in accordance with the state of the apparatus, both of displaying the representative icon and control of the output content from the output device can be performed. Thus, the status of the apparatus can be more assuredly understood.

More preferably, the output device is associated with a plurality of the wireless terminal devices, and on the basis of corresponding pieces of the state information, the output controller performs the output control in accordance with a state having a highest priority among the states of the contacts of each of the plurality of wireless terminal devices.

Due to this configuration, if the supervisor confirms the output content from the output device, the supervisor can comprehensively understand the statuses of the plurality of apparatuses.

More preferably, the output device is associated with a plurality of the wireless terminal devices, and the output controller performs the output control in accordance with priorities provided to corresponding ones of the wireless terminal devices.

Due to this configuration, even when abnormalities have occurred in a plurality of apparatuses, it is possible to cause the output device to output a content according to the state of the apparatus that corresponds to the wireless terminal device having a high priority.

More preferably, the output device is associated with a plurality of the wireless terminal devices, and the output controller performs the output control in accordance with priorities provided to the respective contacts of corresponding ones of the wireless terminal devices.

Due to this configuration, even when abnormalities have occurred in a plurality of apparatuses, it is possible to cause the output device to output a content according to the state of an apparatus that is in a state having a high priority that should be notified of.

More preferably, the output device is associated with a plurality of the wireless terminal devices, and the output controller performs the output control on the basis of the state information of a wireless terminal device designated in advance among corresponding ones of the wireless terminal devices.

Due to this configuration, even when a plurality of wireless terminal devices are associated with one output device, the supervisor can more assuredly understand the status of the apparatus that corresponds to the designated wireless terminal device.

A management system according to an embodiment of the present disclosure includes: one or a plurality of wireless terminal devices each having a plurality of contacts, and each being configured to transmit state information indicating a state of each contact; and a management device configured to receive the state information transmitted from each wireless terminal device, and to perform, on the basis of the received state information, a process of displaying a representative icon representing the wireless terminal device. A possible state of the contact is any one of "closed", "open", and "unconnected". The management device sets a display mode of the representative icon in accordance with a priority of the state of the contact.

Due to this configuration, even when the respective states of the plurality of contacts are different, the representative icon is displayed in a mode that corresponds to a state having a high priority.

That is, if a plurality of states of the apparatus are respectively associated with the states of a plurality of contacts, it is possible to display the representative icon in a mode according to a state having a high priority that the supervisor should be notified of, among the plurality of states of the apparatus. Therefore, when a plurality of states have occurred in an apparatus to be monitored, the status of the apparatus can be more appropriately understood.

A management method according to an embodiment of the present disclosure is to be performed in a management device. The management method includes the steps of: acquiring, from one or a plurality of wireless terminal devices each having a plurality of contacts, state information indicating a state of each contact; and performing, on the basis of the acquired state information, a process of displaying a representative icon representing each wireless terminal device. A possible state of the contact is any one of "closed", "open", and "unconnected". In the step of performing the process of displaying the representative icon, a display mode of the representative icon is set in accordance with a priority of the state of the contact.

Due to this method, even when the respective states of the plurality of contacts are different, the representative icon is displayed in a mode that corresponds to a state having a high priority.

That is, if a plurality of states of the apparatus are respectively associated with the states of a plurality of contacts, it is possible to display the representative icon in a mode according to a state having a high priority that the supervisor should be notified of, among the plurality of states of the apparatus. Therefore, when a plurality of states have occurred in an apparatus to be monitored, the status of the apparatus can be more appropriately understood.

A management program according to an embodiment of the present disclosure is to be used in a management device. The management program causes a computer to function as: an acquisition unit configured to acquire, from one or a plurality of wireless terminal devices each having a plurality of contacts, state information indicating a state of each contact; and a display processing unit configured to perform, on the basis of the state information acquired by the acquisition unit, a process of displaying a representative icon representing each wireless terminal device. A possible state of the contact is any one of "closed", "open", and "unconnected". The display processing unit sets a display mode of the representative icon in accordance with a priority of the state of the contact.

Due to this configuration, even when the respective states of the plurality of contacts are different, the representative icon is displayed in a mode that corresponds to a state having a high priority.

That is, if a plurality of states of the apparatus are respectively associated with the states of a plurality of contacts, it is possible to display the representative icon in a mode according to a state having a high priority that the supervisor should be notified of, among the plurality of states of the apparatus. Therefore, when a plurality of states have occurred in an apparatus to be monitored, the status of the apparatus can be more appropriately understood.

Hereinafter, an embodiment of the present disclosure will be described with reference to the drawings. In the drawings, the same or corresponding parts are denoted by the same reference signs, and description thereof is not repeated. At least some parts of the embodiment described below can be combined together as desired.

<Configuration and Basic Operation>

[Overall Configuration]

FIG. 1 shows a configuration of a management system according to an embodiment of the present disclosure.

With reference to FIG. 1, a management system 201 includes: a management device 101 provided in a target facility such as a plant; a plurality of wireless terminal devices 102; a plurality of access points 121; and a plurality of alarm lamps 131.

The plurality of wireless terminal devices 102 are each a battery-operated device, for example, and are respectively mounted to a plurality of apparatuses X.

Each apparatus X is an apparatus such as a dust collector. The plurality of apparatuses X may be of the same type, or may be of different types from each other.

Figure 2:
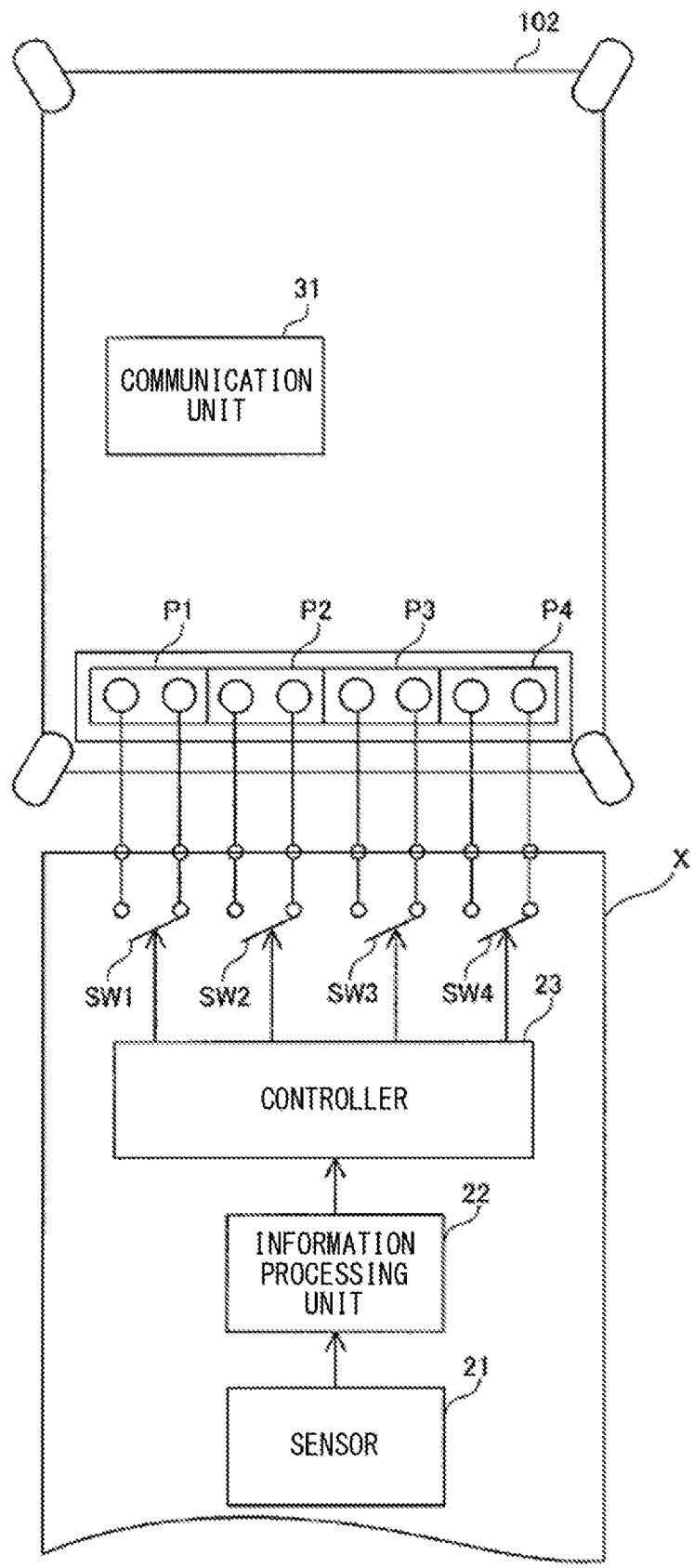
FIG. 2 shows one example of connection between a wireless terminal device and an apparatus shown in FIG. 1.

FIG. 2 shows one example of connection between a wireless terminal device and an apparatus shown in FIG. 1.

With reference to FIG. 2, each wireless terminal device 102 is a device that includes a plurality of contacts P and a communication unit 31, and that measures an open state or a closed state of the plurality of contacts P. The management system 201 further includes a plurality of switches SW, a sensor 21, an information processing unit 22, and a controller 23. The plurality of switches SW, the sensor 21, the information processing unit 22, and the controller 23 are mounted in an apparatus X, for example.

In the example shown in FIG. 2, as one example, the wireless terminal device 102 includes four contacts P1 to P4, and the apparatus X has four switches SW1 to SW4 mounted therein. Each of the contacts P1 to P4 has two terminals. The contacts P1 to P4 are connected to the four switches SW1 to SW4, respectively.

The sensor 21 measures, for example, the temperature or humidity of the apparatus X, the value of the current flowing in the apparatus X, or the like, and outputs the measurement result to the information processing unit 22. On the basis of the measurement result received from the sensor 21, the information processing unit 22 detects any abnormality that has occurred in the apparatus X, and outputs the detection result to the controller 23.

On the basis of the detection result received from the information processing unit 22, the controller 23 controls the four switches SW1 to SW4. Here, it is assumed that the four switches SW1 to SW4 are in an open state during normal time, i.e., in a state where no abnormality has occurred in the apparatus X.

For example, when the controller 23 has received from the information processing unit 22 a signal indicating a detection result to the effect that a significant abnormality has occurred in the apparatus X (hereinafter, referred to as "warning signal"), the controller 23 controls the switch SW1 to change the state of the contact P1 from "open" to "closed".

For example, when the controller 23 has received from the information processing unit 22 a signal indicating a detection result to the effect that an abnormality of a relatively low level has occurred in the apparatus X (hereinafter, referred to as "abnormality signal"), the controller 23 controls the switch SW2 to change the state of the contact P2 from "open" to "closed".

For example, when the controller 23 has received from the information processing unit 22 a signal indicating a detection result to the effect that work such as cleaning is necessary for the apparatus X (hereinafter, referred to as "work request signal"), the controller 23 controls the switch SW3 to change the state of the contact P3 from "open" to "closed".

For example, when the controller 23 has received from the information processing unit 22 a signal indicating a detection result to the effect that the apparatus X is not operating (hereinafter, referred to as "operation stop signal"), the controller 23 controls the switch SW4 to change the state of the contact P4 from "open" to "closed".

The communication unit 31 in the wireless terminal device 102 transmits state information indicating a state of each of the contacts P1 to P4, to the management device 101 via an access point 121 shown in FIG. 1. Thus, due to the configuration in which the wireless terminal device 102 transmits the state information to the management device 101 through wireless communication, improvement of the degree of freedom of installation of the wireless terminal device 102 and reduction of costs for installation of the wireless terminal device 102 can be realized, when compared with a case where wired communication is performed.

The management device 101 is provided in a management room or the like in the target facility, receives a plurality of pieces of state information respectively transmitted from the plurality of wireless terminal devices 102, and performs a process of displaying contents based on the plurality of pieces of state information, on a monitor or the like of the management device 101.

In the example shown in FIG. 1, three access points 121 respectively corresponding to the three wireless terminal devices 102 are provided. However, one access point 121 may be provided for a plurality of wireless terminal devices 102.

[Management Device]

Figure 3:
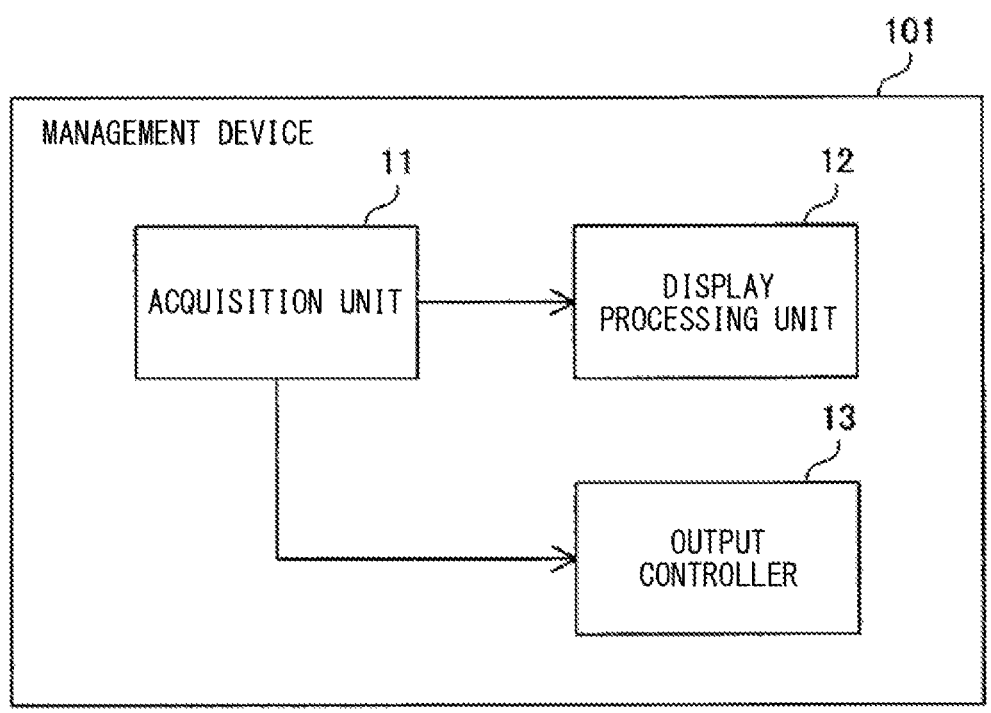
FIG. 3 shows a configuration of a management device according to the embodiment of the present disclosure.

FIG. 3 shows a configuration of the management device according to the embodiment of the present disclosure.

With reference to FIG. 3, the management device 101 includes an acquisition unit 11, a display processing unit 12, and an output controller 13.

The acquisition unit 11 receives a plurality of pieces of state information respectively transmitted from the plurality of wireless terminal devices 102, and outputs the received plurality of pieces of state information, to the display processing unit 12 and the output controller 13.

On the basis of the plurality of pieces of state information received from the acquisition unit 11, the display processing unit 12 performs a process of displaying, on a monitor or the like of the display processing unit 12, a management screen Sc on which the position and the content regarding the states of the contacts P1 to P4 of each wireless terminal device 102 are shown. The management screen Sc includes a map of the target facility, for example. On the management screen Sc, a plurality of representative icons IcA respectively indicating the plurality of wireless terminal devices 102 are displayed at corresponding positions in the map.

(Display of Representative Icon)

Figure 4:
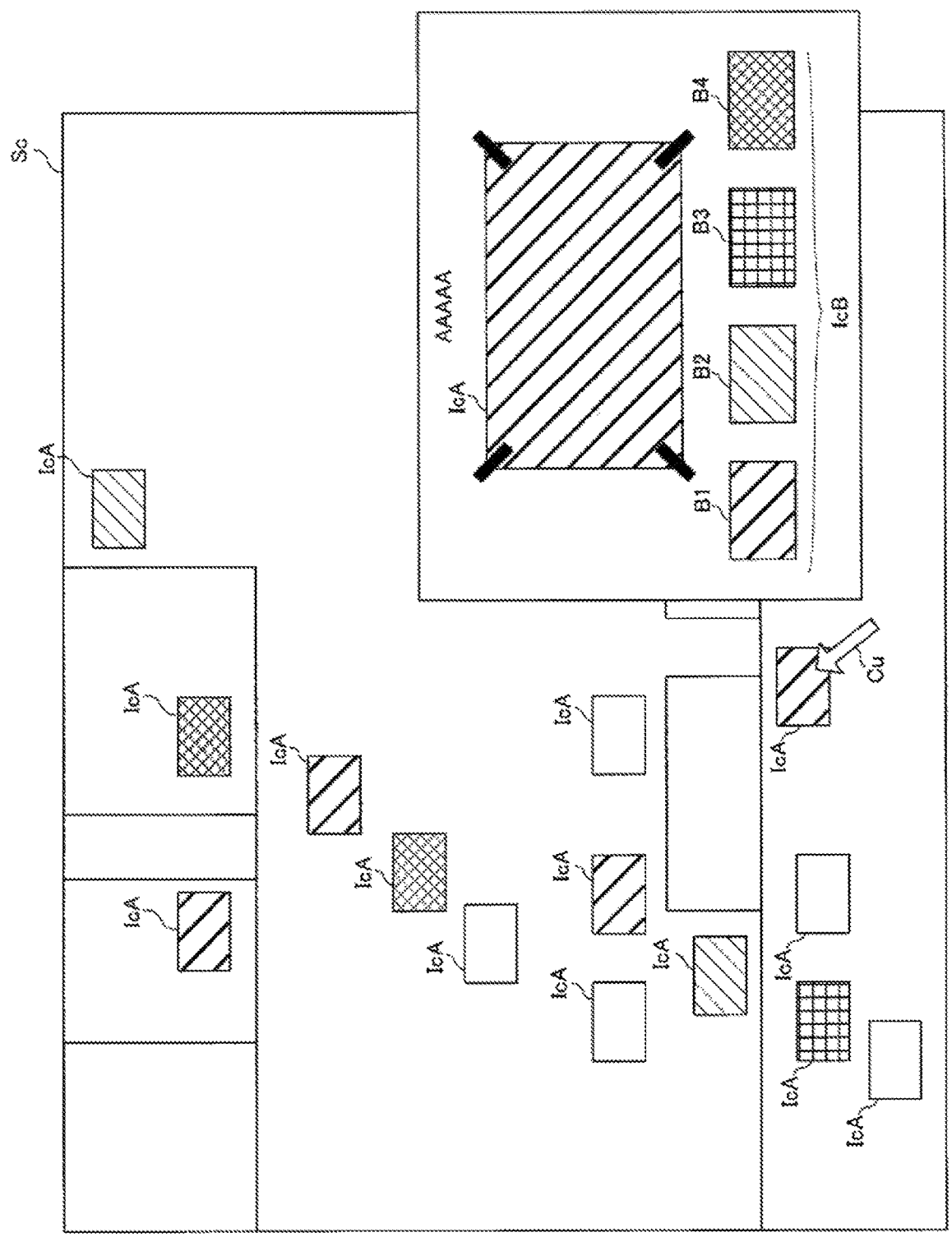
FIG. 4 shows one example of the management screen displayed by the management device shown in FIG. 3.

FIG. 4 shows one example of the management screen displayed by the management device shown in FIG. 3.

With reference to FIG. 2 to FIG. 4, for each wireless terminal device 102, the display processing unit 12 sets a color for a corresponding representative icon IcA in accordance with the priority of the state of each contact P. More specifically, a possible state of the contact P is any one of a closed state, an open state, or a state of being unconnected to a circuit of the apparatus X, and a higher priority is provided in the order of "closed", "open", and "unconnected".

When at least one of the contacts P1 to P4 of a wireless terminal device 102 is in a closed state, the display processing unit 12 performs a process of displaying a representative icon IcA that corresponds to the wireless terminal device 102, in a color that corresponds to "closed", for example, red, yellow, green, or blue.

In FIG. 4, a representative icon IcA indicated in red is provided with hatching by left-upward oblique lines. A representative icon IcA indicated in yellow is provided with hatching by right-upward oblique lines. A representative icon IcA indicated in green is provided with grid-like hatching. A representative icon IcA indicated in blue is provided with hatching in which left-upward oblique lines and right-upward oblique lines are crossed.

When no contact P, among the contacts P1 to P4 of a wireless terminal device 102, is in a closed state and at least one of the contacts P1 to P4 is in an open state, the display processing unit 12 performs a process of displaying a representative icon IcA that corresponds to the wireless terminal device 102, in a color that corresponds to "open", for example, white.

When all of the contacts P1 to P4 of a wireless terminal device 102 are in an unconnected state, the display processing unit 12 performs a process of displaying a representative icon IcA that corresponds to the wireless terminal device 102, in a color that corresponds to "unconnected", for example, gray.

When displaying a representative icon IcA in a color that corresponds to "closed", the display processing unit 12 sets a color of the representative icon IcA in accordance with the priority of each contact P. More specifically, as for the contacts P1 to P4, a higher priority is provided in the order of the contact P1, the contact P2, the contact P3, and the contact P4, for example.

For example, when the state of the contact P1 is "closed", the display processing unit 12 sets the color of the representative icon IcA to red. For example, when the state of the contact P1 is "open" or "unconnected" and the state of the contact P2 is "closed", the display processing unit 12 sets the color of the representative icon IcA to yellow.

For example, when each of the state of the contact P1 and the state of the contact P2 is "open" or "unconnected" and the state of the contact P3 is "closed", the display processing unit 12 sets the color of the representative icon IcA to green. For example, when each of the state of the contact P1, the state of the contact P2, and the state of the contact P3 is "open" or "unconnected" and the state of the contact P4 is closed, the display processing unit 12 sets the color of the representative icon IcA to blue.

Then, as shown in FIG. 4, the display processing unit 12 performs a process of displaying the plurality of representative icons IcA that respectively correspond to the plurality of wireless terminal devices 102, in the set colors.

The priorities of the states of the contacts P are not limited to the order of "closed", "open", and "unconnected", and can be set by a supervisor as desired. In addition, the priorities of the contacts P are not limited to the order of the contact P1, the contact P2, the contact P3, and the contact P4, and can be set by the supervisor as desired.

The colors that correspond to the contacts P1 to P4 are not limited to red, yellow, green, and blue, respectively, and may be other colors. Alternatively, the same color may be associated with at least two of the contacts P1 to P4.

That is, when at least one of the contacts P1 to P4 of the wireless terminal device 102 is in a closed state, the display processing unit 12 may perform a process of displaying the representative icon IcA in a predetermined color. The color corresponding to each contact P can be set by the supervisor as desired.

(Display of Contact Icon)

When the supervisor performs a predetermined operation on a representative icon IcA by operating the management device 101, the display processing unit 12 performs a process of displaying, together with the representative icon IcA, a contact icon IcB that indicates the states of the respective contacts P1 to P4 of the wireless terminal device 102 that corresponds to the representative icon IcA.

Specifically, as shown in FIG. 4, it is assumed that the supervisor has placed a cursor Cu at one of the plurality of representative icons IcA included in the management screen Sc.

In this case, the acquisition unit 11 receives the operation performed by the supervisor, and outputs, to the display processing unit 12, operation information indicating the content of the operation. Upon receiving the operation information from the acquisition unit 11, the display processing unit 12 recognizes the representative icon IcA selected by the supervisor, on the basis of the operation information. Then, the display processing unit 12 performs a process of displaying a contact icon IcB that corresponds to the representative icon IcA.

The contact icon IcB includes four icons B1 to B4, for example. The four icons B1 to B4 respectively correspond to the four contacts P1 to P4 of the wireless terminal device 102. The four icons B1 to B4 are provided with colors in accordance with the states of the corresponding contacts P1 to P4.

On the basis of state information received via the acquisition unit 11 from a wireless terminal device 102, the display processing unit 12 sets the color of the icon B1 to gray when the contact P1 of the wireless terminal device 102 is in an unconnected state, sets the color of the icon B1 to white when the contact P1 is in an open state, and sets the color of the icon B1 to red when the contact P1 is in a closed state, for example.

On the basis of the state information, the display processing unit 12 sets the color of the icon B2 to gray when the contact P2 of the wireless terminal device 102 is in an unconnected state, sets the color of the icon B2 to white when the contact P2 is in an open state, and sets the color of the icon B2 to yellow when the contact P2 is in a closed state, for example.

On the basis of the state information, the display processing unit 12 sets the color of the icon B3 to gray when the contact P3 of the wireless terminal device 102 is in an unconnected state, sets the color of the icon B3 to white when the contact P3 is in an open state, and sets the color of the icon B3 to green when the contact P3 is in a closed state, for example.

On the basis of the state information, the display processing unit 12 sets the color of the icon B4 to gray when the contact P4 of the wireless terminal device 102 is in an unconnected state, sets the color of the icon B4 to white when the contact P4 is in an open state, and sets the color of the icon B4 to blue when the contact P4 is in a closed state, for example.

Then, the display processing unit 12 performs a process of displaying the icons B1 to B4 in the colors respectively set. Accordingly, if the supervisor confirms the colors of the icons B1 to B4 displayed on the screen, the supervisor can understand the states of the corresponding contacts P1 to P4.

In addition, the display processing unit 12 performs a process of displaying, together with the contact icon IcB, identification information of the wireless terminal device 102, or the name or the like of the apparatus X that corresponds to the wireless terminal device 102, for example.

The display processing unit 12 may perform the process of displaying the management screen Sc in a display device that is not part of the management device 101.

In the example shown in FIG. 4, the display processing unit 12 performs a process of displaying the contact icon IcB on the same screen on which the plurality of representative icons IcA are displayed. However, the present invention is not limited to such a configuration. The display processing unit 12 may perform a process of displaying the contact icon IcB on a screen that is not the screen where the plurality of representative icons IcA are displayed.

The display processing unit 12 may perform a process of displaying a plurality of contact icons IcB that respectively correspond to all the representative icons IcA included in the management screen Sc, without being limited to the representative icon IcA for which the predetermined operation has been performed, for example.

(Lighting of Alarm Lamp)

With reference to FIG. 1 and FIG. 3 again, on the basis of state information received via the acquisition unit 11 from a wireless terminal device 102, the output controller 13 of the management device 101 performs an output control for controlling the output content of an output device associated with the wireless terminal device 102. The output device is an alarm lamp 131, for example. As one example of the output control, the output controller 13 performs control of lighting of the alarm lamp 131.

Here, it is assumed that, as shown in FIG. 1, a plurality of alarm lamps 131 are respectively associated with a plurality of wireless terminal devices 102.

FIG. 5 shows one example of a lighting pattern of an alarm lamp controlled by the management device according to the embodiment of the present disclosure. Here, it is assumed that the alarm lamp 131 has a red light, a yellow light, a green light, and a blue light.

In addition, here, it is assumed that the contacts P1 to P4 of each wireless terminal device 102 are connected to the switches SW1 to SW4 of a corresponding apparatus X. That is, it is assumed that the state of each of the contacts P1 to P4 is "closed" or "open".

(a) Pattern 1

With reference to FIG. 5, for example, as in pattern 1, it is assumed that the information processing unit 22 mounted to a certain apparatus X has outputted a warning signal, an abnormality signal, a work request signal, and an operation stop signal. In this case, the colors of the icons B1 to B4 included in the contact icon IcB that corresponds to the apparatus X are set to red, yellow, green, and blue, respectively. The color of the representative icon IcA corresponding to the apparatus X is set to the color of the icon B1, i.e., red, that corresponds to the contact P1 having the highest priority.

In this case, the output controller 13 transmits a lighting command that instructs turning on the four lights of red, yellow, green, and blue, to an alarm lamp 131 that corresponds to the apparatus X. Then, on the basis of the lighting command received from the output controller 13, the alarm lamp 131 turns on the four lights of red, yellow, green, and blue.

(b) Pattern 2

For example, as in pattern 2, it is assumed that the information processing unit 22 mounted to a certain apparatus X has outputted an abnormality signal, a work request signal, and an operation stop signal. In this case, the colors of the icons B1 to B4 included in the contact icon IcB that corresponds to the apparatus X are set to white, yellow, green, and blue, respectively. The color of the representative icon IcA corresponding to the apparatus X is set to the color of the icon B2, i.e., yellow, that corresponds to the contact P2 having the highest priority among the contacts P2 to P4 which are in a closed state.

In this case, the output controller 13 transmits, to the alarm lamp 131, a lighting command that instructs turning on three lights of yellow, green, and blue. Then, on the basis of the lighting command received from the output controller 13, the alarm lamp 131 turns on the three lights of yellow, green, and blue.

(c) Pattern 3

For example, as in pattern 3, it is assumed that the information processing unit 22 mounted to a certain apparatus X has outputted a work request signal and an operation stop signal. In this case, the colors of the icons B1 to B4 included in the contact icon IcB that corresponds to the apparatus X are set to white, white, green, and blue, respectively. The color of the representative icon IcA corresponding to the apparatus X is set to the color of the icon B3, i.e., green, that corresponds to the contact P3 having the higher priority between the contact P3 and the contact P4 which are in a closed state.

In this case, the output controller 13 transmits a lighting command that instructs turning on two lights of green and blue, to the alarm lamp 131 that corresponds to the apparatus X. Then, on the basis of the lighting command received from the output controller 13, the alarm lamp 131 turns on the two lights of green and blue.

(d) Pattern 4

For example, as in pattern 4, it is assumed that the information processing unit 22 mounted to a certain apparatus X has outputted an operation stop signal. In this case, the colors of the icons B1 to B4 included in the contact icon IcB that corresponds to the apparatus X are set to white, white, white, and blue, respectively. The color of the representative icon IcA corresponding to the apparatus X is set to the color of the icon B4, i.e., blue, that corresponds to the contact P4 which is in a closed state.

In this case, the output controller 13 transmits, to the alarm lamp 131, a lighting command that instructs turning on the blue light. Then, on the basis of the lighting command received from the output controller 13, the alarm lamp 131 turns on the blue light.

(e) Pattern 5 For example, as in pattern 5, it is assumed that the information processing unit 22 mounted to a certain apparatus X has outputted none of the warning signal, the abnormality signal, the work request signal, and the operation stop signal. That is, it is assumed that the apparatus X is operating normally. In this case, the colors of the icons B1 to B4 included in the contact icon IcB that corresponds to the apparatus X are all set to white. The color of the representative icon IcA corresponding to the apparatus X is set to white.

In this case, the output controller 13 does not transmit any lighting command to the alarm lamp 131. Accordingly, the lights in the alarm lamp 131 are in a state of being turned off.

As the output control, instead of controlling the lighting of the alarm lamp 131, the output controller 13 may set, on the basis of state information, a display content for an electric bulletin board on which the respective states of the plurality of apparatuses X in the target facility are displayed in colors, for example.

Not limited to the configuration as described above, the management device 101 only needs to be configured to perform a process of displaying the representative icons IcA. For example, the management device 101 may be configured not to perform the process of displaying the contact icon IcB. The management device 101 may be configured not to perform the output control of controlling the output content of the output device.

<Operation Flow>

Each device in the management system 201 includes a computer. An arithmetic processing unit such as a CPU in the computer reads out a program including part or all steps in the following sequence diagram from a memory that is not shown, and executes the program. Each of the programs for the plurality of devices can be installed from outside. Each of the programs for the plurality of devices is distributed in a state of being stored in a storage medium.

Figure 6:
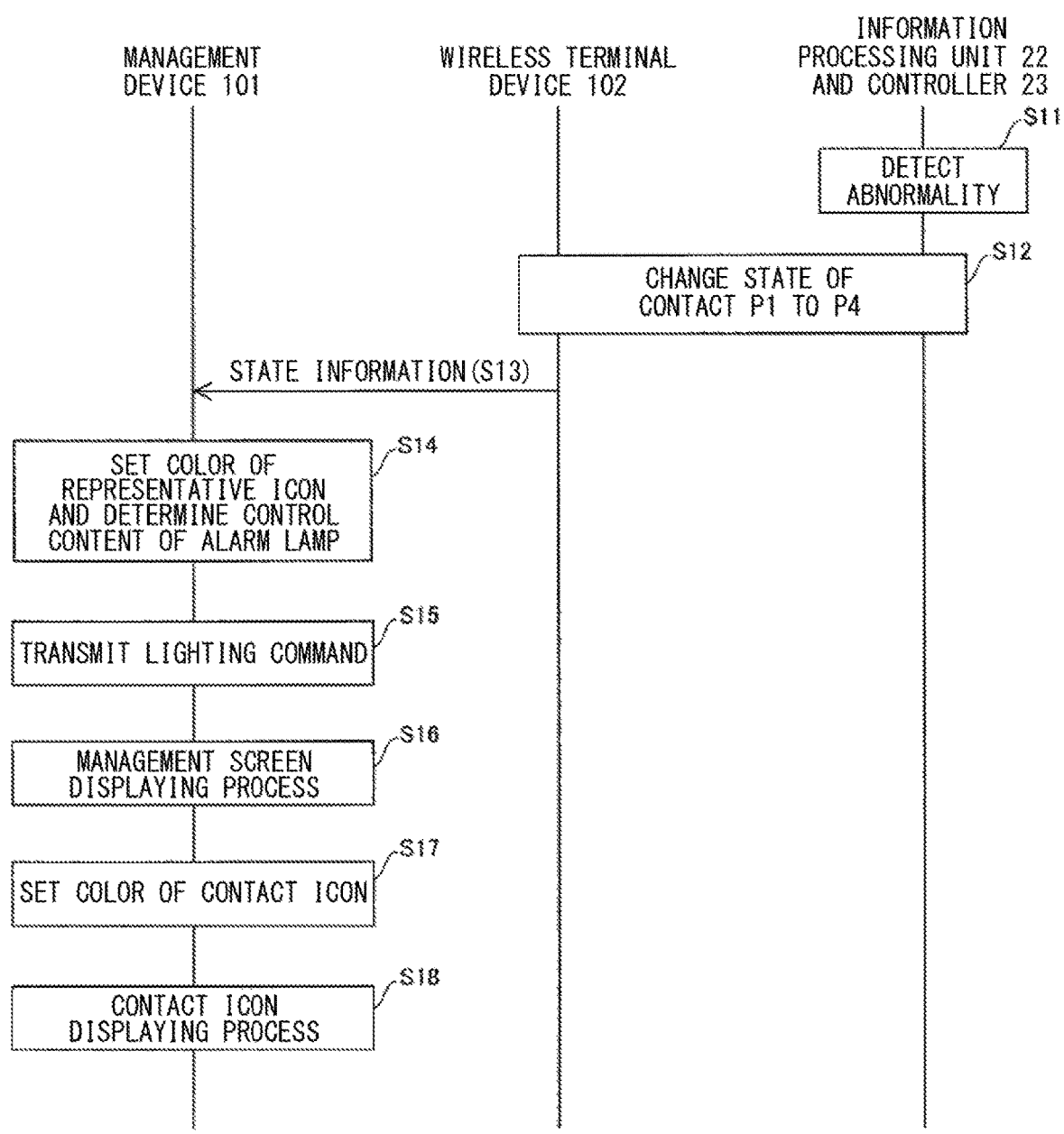
FIG. 6 is a sequence diagram showing one example of the flow of operation performed in the management system according to the embodiment of the present disclosure.

FIG. 6 is a sequence diagram showing one example of the flow of operation performed in the management system according to the embodiment of the present disclosure. Here, it is assumed that the state of each of the contacts P1 to P4 is "closed" or "open".

With reference to FIG. 6, first, on the basis of a measurement result by the sensor 21, the information processing unit 22 detects an abnormality that has occurred in the apparatus X. Then, the information processing unit 22 outputs the detection result to the controller 23 (step S11).

Next, by controlling the switches SW1 to SW4 on the basis of the detection result received from the information processing unit 22, the controller 23 sets the states of the contacts P1 to P4 of the wireless terminal device 102 to "open" or "closed" (step S12).

Next, the communication unit 31 of the wireless terminal device 102 transmits, to the management device 101, state information indicating the state of each of the contacts P1 to P4 (step S13).

Next, the management device 101 receives the state information transmitted from the wireless terminal device 102, and sets the color of the representative icon IcA that corresponds to the wireless terminal device 102, on the basis of the received state information.

In addition, on the basis of the state information, the management device 101 determines a control content for the alarm lamp 131 that corresponds to the wireless terminal device 102. That is, the management device 101 determines whether or not to turn on the alarm lamp 131. When having determined to turn on the alarm lamp 131, the management device 101 sets a color to be lit (step S14).

Next, when having determined to turn on the alarm lamp 131, the management device 101 transmits, to the alarm lamp 131, a lighting command to turn on the light of the set color (step S15). Then, upon receiving the lighting command transmitted from the management device 101, the alarm lamp 131 turns on the light of the alarm lamp 131 on the basis of the received lighting command.

When the management device 101 has determined not to turn on the alarm lamp 131, the management device 101 does not transmit any lighting command to the alarm lamp 131.

Next, the management device 101 performs a process of displaying the management screen Sc that includes the representative icon IcA in the set color (step S16). The management device 101 may perform the process of displaying the management screen Sc before transmitting the lighting command (step S15).

Next, it is assumed that the supervisor has selected any one among one or a plurality of representative icons IcA on the management screen Sc, has operated the management device 101, and has placed the cursor Cu on the selected representative icon IcA.

In this case, on the basis of the state information from the wireless terminal device 102 that corresponds to the representative icon IcA selected by the supervisor, the management device 101 sets the color of the contact icon IcB that corresponds to the wireless terminal device 102, i.e., the colors of the icons B1 to B4 included in the contact icon IcB (step S17). Then, the management device 101 performs a process of displaying the contact icon IcB in the set color (step S18).

<Modification 1 of Lighting Pattern>

In the example shown in FIG. 1, a plurality of alarm lamps 131 are respectively provided for a plurality of wireless terminal devices 102. However, not limited to such a configuration, one alarm lamp 131 may be provided for a plurality of wireless terminal devices 102. In such a case, the number of alarm lamps 131 to be installed can be reduced, and thus, costs can be reduced.

In this case, the management device 101 receives a plurality of pieces of state information respectively transmitted from the plurality of wireless terminal devices 102, and controls lighting of the one alarm lamp 131 on the basis of the plurality of pieces of state information. For example, on the basis of the content obtained by merging the plurality of pieces of state information, the management device 101 controls lighting of the alarm lamp 131.

More specifically, on the basis of corresponding pieces of the state information, the output controller 13 of the management device 101 performs an output control in accordance with the state having the highest priority, i.e., a closed state, among the states of the contacts P of each of the plurality of wireless terminal devices 102.

For example, the plurality of lights of the alarm lamp 131 respectively correspond to the plurality of contacts P of the wireless terminal device 102. On the basis of corresponding pieces of the state information, the management device 101 confirms, for each light in the alarm lamp 131, the state of a corresponding contact P of each of the plurality of wireless terminal devices 102, and controls the lighting on the basis of the state having the highest priority among the confirmed states.

Specifically, it is assumed that, in the alarm lamp 131, the red light corresponds to the contact P1 of the wireless terminal device 102, the yellow light corresponds to the contact P2 of the wireless terminal device 102, the green light corresponds to the contact P3 of the wireless terminal device 102, and the blue light corresponds to the contact P4 of the wireless terminal device 102.

In this case, when, among the plurality of wireless terminal devices 102, there is at least one wireless terminal device 102 of which the contact P1 is in a closed state, the management device 101 causes the red light of the alarm lamp 131 to be turned on. When, among the plurality of wireless terminal devices 102, there is at least one wireless terminal device 102 of which the contact P2 is in a closed state, the management device 101 causes the yellow light of the alarm lamp 131 to be turned on.

When, among the plurality of wireless terminal devices 102, there is at least one wireless terminal device 102 of which the contact P3 is in a closed state, the management device 101 causes the green light of the alarm lamp 131 to be turned on. When, among the plurality of wireless terminal devices 102, there is at least one wireless terminal device 102 of which the contact P4 is in a closed state, the management device 101 causes the blue light of the alarm lamp 131 to be turned on. In the following, a specific example of the lighting pattern of the alarm lamp 131 is described.

FIG. 7 shows Modification 1 of the lighting pattern of the alarm lamp controlled by the management device according to the embodiment of the present disclosure. Here, it is assumed that one alarm lamp 131 is associated with two wireless terminal devices 102A and 102B.

(a) Pattern 1

With reference to FIG. 7, for example, as in pattern 1, it is assumed that the information processing unit 22 mounted to the apparatus X that corresponds to the wireless terminal device 102A has outputted a warning signal and an abnormality signal. In this case, the colors of the icons B1 to B4 included in the contact icon IcB that corresponds to the wireless terminal device 102A are set to red, yellow, white, and white, respectively.

In addition, it is assumed that the information processing unit 22 mounted to the apparatus X that corresponds to the wireless terminal device 102B has outputted an operation stop signal. In this case, the colors of the icons B1 to B4 included in the contact icon IcB that corresponds to the wireless terminal device 102B are set to white, white, white, and blue, respectively.

In this case, the output controller 13 merges the color of the contact icon IcB that corresponds to the wireless terminal device 102A and the color of the contact icon IcB that corresponds to the wireless terminal device 102B, and transmits, to the alarm lamp 131, a lighting command that instructs turning on three lights of red, yellow, and blue. Then, on the basis of the lighting command received from the output controller 13, the alarm lamp 131 turns on the three lights of red, yellow, and blue.

(b) Pattern 2

For example, as in pattern 2, it is assumed that the information processing unit 22 mounted to the apparatus X that corresponds to the wireless terminal device 102A has outputted an abnormality signal, a work request signal, and an operation stop signal. In this case, the colors of the icons B1 to B4 included in the contact icon IcB that corresponds to the wireless terminal device 102A are set to white, yellow, green, and blue, respectively.

In addition, it is assumed that the information processing unit 22 mounted to the apparatus X that corresponds to the wireless terminal device 102B has outputted a work request signal and an operation stop signal. In this case, the colors of the icons B1 to B4 included in the contact icon IcB that corresponds to the wireless terminal device 102B are set to white, white, green, and blue, respectively.

In this case, the output controller 13 merges the color of the contact icon IcB that corresponds to the wireless terminal device 102A and the color of the contact icon IcB that corresponds to the wireless terminal device 102B, and transmits, to the alarm lamp 131, a lighting command that instructs turning on three lights of yellow, green, and blue. Then, on the basis of the lighting command received from the output controller 13, the alarm lamp 131 turns on the three lights of yellow, green, and blue.

(c) Pattern 3

For example, as in pattern 3, it is assumed that the information processing unit 22 mounted to the apparatus X that corresponds to the wireless terminal device 102A has outputted an operation stop signal. In this case, the colors of the icons B1 to B4 included in the contact icon IcB that corresponds to the wireless terminal device 102A are set to white, white, white, and blue, respectively.

In addition, it is assumed that the apparatus X that corresponds to the wireless terminal device 102B is operating normally. In this case, the colors of the icons B1 to B4 included in the contact icon IcB that corresponds to the wireless terminal device 102B are all set to white.

In this case, the output controller 13 merges the color of the contact icon IcB that corresponds to the wireless terminal device 102A and the color of the contact icon IcB that corresponds to the wireless terminal device 102B, and transmits, to the alarm lamp 131, a lighting command that instructs turning on the blue light. Then, on the basis of the lighting command received from the output controller 13, the alarm lamp 131 turns on the blue light.

(d) Pattern 4

For example, as in pattern 4, it is assumed that the apparatus X that corresponds to the wireless terminal device 102A is operating normally. In this case, the colors of the icons B1 to B4 included in the contact icon IcB that corresponds to the wireless terminal device 102A are all set to white.

In addition, it is assumed that the information processing unit 22 mounted to the apparatus X that corresponds to the wireless terminal device 102B has outputted a warning signal and an abnormality signal. In this case, the colors of the icons B1 to B4 included in the contact icon IcB that corresponds to the wireless terminal device 102B are set to red, yellow, white, and white, respectively.

In this case, the output controller 13 merges the color of the contact icon IcB that corresponds to the wireless terminal device 102A and the color of the contact icon IcB that corresponds to the wireless terminal device 102B, and transmits, to the alarm lamp 131, a lighting command that instructs turning on two lights of red and yellow. Then, on the basis of the lighting command received from the output controller 13, the alarm lamp 131 turns on the two lights of red and yellow.

(e) Pattern 5

For example, as in pattern 5, it is assumed that the apparatus X that corresponds to the wireless terminal device 102A is operating normally. In this case, the colors of the icons B1 to B4 included in the contact icon IcB that corresponds to the wireless terminal device 102A are all set to white.

In addition, it is assumed that the apparatus X that corresponds to the wireless terminal device 102B is operating normally. In this case, the colors of the icons B1 to B4 included in the contact icon IcB that corresponds to the wireless terminal device 102B are all set to white.

In this case, the output controller 13 determines not to transmit any lighting command to the alarm lamp 131. Accordingly, the lights in the alarm lamp 131 are in a state of being turned off.

In FIG. 7, one alarm lamp 131 is associated with two wireless terminal devices 102. However, one alarm lamp 131 may be associated with three or more wireless terminal devices 102.

<Modification 2 of Lighting Pattern>

The management device 101 according to Modification 1 described above controls lighting of the alarm lamp 131 on the basis of the content obtained by merging a plurality of pieces of state information. In contrast, the management device 101 according to Modification 2 controls lighting of the alarm lamp 131 in accordance with the priority provided to each wireless terminal device 102.

FIG. 8 shows Modification 2 of the lighting pattern of the alarm lamp controlled by the management device according to the embodiment of the present disclosure.

With reference to FIG. 8, here, it is assumed that one alarm lamp 131A is associated with three wireless terminal devices 102A, 102B, and 102C, and one alarm lamp 131B is associated with two wireless terminal devices 102D and 102E.

In addition, it is assumed that, as for the three wireless terminal devices 102A, 102B, and 102C, a higher priority is provided in the order of the wireless terminal device 102A, the wireless terminal device 102B, and the wireless terminal device 102C. In addition, it is assumed that, as for the two wireless terminal devices 102D and 102E, a higher priority is provided in the order of the wireless terminal device 102E and the wireless terminal device 102D. The priority of each wireless terminal device 102 can be set by the supervisor as desired.

(a) Pattern 1

The output controller 13 of the management device 101 determines the color to be lit of the alarm lamp 131A, on the basis of the color of the contact icon IcB that corresponds to the wireless terminal device 102A having the highest priority among the three wireless terminal devices 102A, 102B, and 102C, for example.

For example, as in pattern 1, it is assumed that the information processing unit 22 mounted to the apparatus X that corresponds to the wireless terminal device 102A has outputted a warning signal and an abnormality signal. In this case, the colors of the icons B1 to B4 included in the contact icon IcB that corresponds to the wireless terminal device 102A are set to red, yellow, white, and white, respectively.

In this case, the output controller 13 transmits, to the alarm lamp 131A, a lighting command that instructs turning on the lights of the color of the contact icon IcB that corresponds to the wireless terminal device 102A, i.e., two lights of red and yellow. Then, on the basis of the lighting command received from the output controller 13, the alarm lamp 131A turns on the two lights of red and yellow.

(b) Pattern 2

When the wireless terminal device 102E, which has the higher priority between the wireless terminal device 102D and the wireless terminal device 102E, is operating normally, the output controller 13 determines the color to be lit of the alarm lamp 131B on the basis of the color of the contact icon IcB that corresponds to the wireless terminal device 102D.

For example, as in pattern 2, it is assumed that the information processing unit 22 mounted to the apparatus X that corresponds to the wireless terminal device 102D has outputted a work request signal and an operation stop signal. In this case, the colors of the icons B1 to B4 included in the contact icon IcB that corresponds to the wireless terminal device 102D are set to white, white, green, and blue, respectively.

In this case, the output controller 13 transmits, to the alarm lamp 131B, a lighting command that instructs turning on the lights of the color of the contact icon IcB that corresponds to the wireless terminal device 102D, i.e., two lights of green and blue. Then, on the basis of the lighting command received from the output controller 13, the alarm lamp 131B turns on the two lights of green and blue.

(c) Pattern 3

For example, as in pattern 3, it is assumed that the information processing unit 22 mounted to the apparatus X that corresponds to the wireless terminal device 102A has outputted an operation stop signal. In this case, the colors of the icons B1 to B4 included in the contact icon IcB that corresponds to the wireless terminal device 102A are set to white, white, white, and blue, respectively.

In this case, the output controller 13 transmits, to the alarm lamp 131A, a lighting command that instructs turning on the lights of the color of the contact icon IcB that corresponds to the wireless terminal device 102A having the highest priority among the wireless terminal devices 102A, 102B, and 102C, i.e., the blue light. Then, on the basis of the lighting command received from the output controller 13, the alarm lamp 131A turns on the blue light.

(d) Pattern 4

For example, as in pattern 4, it is assumed that the information processing unit 22 mounted to the apparatus X that corresponds to the wireless terminal device 102E has outputted an abnormality signal, a work request signal, and an operation stop signal. In this case, the colors of the icons B1 to B4 included in the contact icon IcB that corresponds to the wireless terminal device 102E are set to white, yellow, green, and blue, respectively.

In this case, the output controller 13 transmits, to the alarm lamp 131B, a lighting command that instructs turning on the lights of the color of the contact icon IcB that corresponds to the wireless terminal device 102E, which has the higher priority between the wireless terminal devices 102D and 102E, i.e., three lights of yellow, green, and blue. Then, on the basis of the lighting command received from the output controller 13, the alarm lamp 131B turns on the three lights of yellow, green, and blue.

<Modification 3 of Lighting Pattern>

The management device 101 according to Modification 3 controls lighting of the alarm lamp 131 in accordance with the priority provided to each contact P of each wireless terminal device 102.

Figure 9:
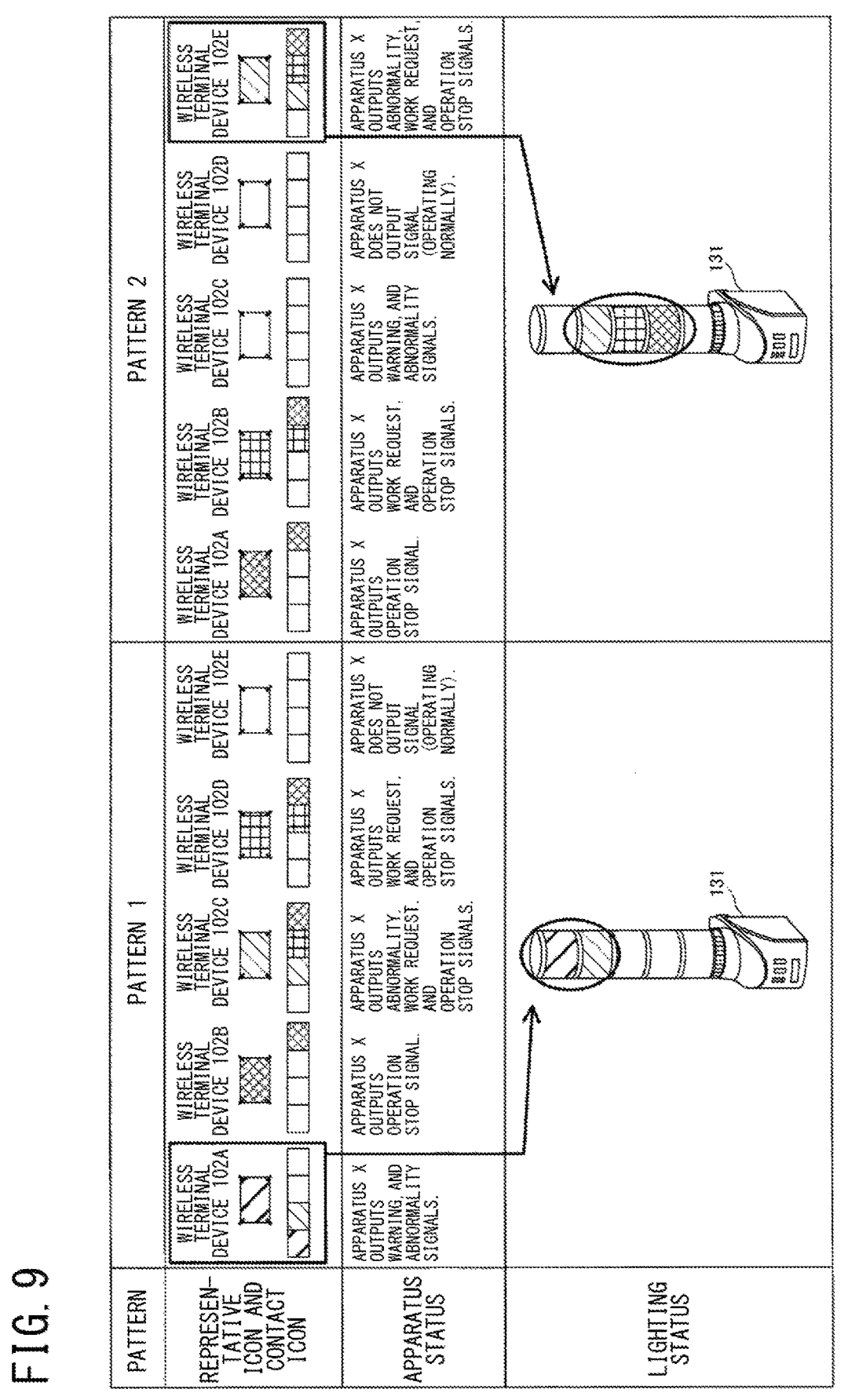

FIG. 9 shows Modification 3 of the lighting pattern of the alarm lamp controlled by the management device according to the embodiment of the present disclosure.

With reference to FIG. 9, here, it is assumed that one alarm lamp 131 is associated with five wireless terminal devices 102A to 102E.

In addition, it is assumed that each of the wireless terminal devices 102A to 102E includes contacts P1 to P4, and as for the contacts P1 to P4, a higher priority is provided in the order of the contact P1, the contact P2, the contact P3, and the contact P4. The priority of each contact P can be set by the supervisor as desired.

(a) Pattern 1

The output controller 13 of the management device 101 confirms whether or not there is a wireless terminal device 102 of which the contact P1 having the highest priority among the contacts P1 to P4 is in a closed state. Then, when there is a wireless terminal device 102 of which the contact P1 is in a closed state, the management device 101 determines the color to be lit of the alarm lamp 131A on the basis of the color of the contact icon IcB that corresponds to the wireless terminal device 102.

In the pattern 1 shown in FIG. 9, as for the wireless terminal device 102A, the contact P1 and the contact P2 are in a closed state, and the contact P3 and the contact P4 are in an open state.

In this case, the output controller 13 transmits, to the alarm lamp 131, a lighting command that instructs turning on the lights of the color of the contact icon IcB that corresponds to the wireless terminal device 102A, i.e., two lights of red and yellow. Then, on the basis of the lighting command received from the output controller 13, the alarm lamp 131 turns on the two lights of red and yellow.

(b) Pattern 2

When there is no wireless terminal device 102 of which the contact P1 is in a closed state, the output controller 13 confirms whether or not there is a wireless terminal device 102 of which the contact P2 having the next-highest priority among the contacts P1 to P4 is in a closed state. When there is a wireless terminal device 102 of which the contact P2 is in a closed state, the output controller 13 determines the color to be lit of the alarm lamp 131A on the basis of the color of the contact icon IcB that corresponds to the wireless terminal device 102.

In the pattern 2 shown in FIG. 9, as for the wireless terminal device 102E, the contact P2 to the contact P4 are in a closed state and the contact P1 is in an open state.

In this case, the output controller 13 transmits, to the alarm lamp 131, a lighting command that instructs turning on the lights of the color of the contact icon IcB that corresponds to the wireless terminal device 102E, i.e., three lights of yellow, green, and blue. Then, on the basis of the lighting command received from the output controller 13, the alarm lamp 131 turns on the three lights of yellow, green, and blue When there is no wireless terminal device 102 in which at least one of the contact P1 and the contact P2 is in a closed state, the output controller 13 confirms whether or not there is a wireless terminal device 102 of which the contact P3 having the next-highest priority is in a closed state. When there is a wireless terminal device 102 of which the contact P3 is in a closed state, the management device 101 determines the color to be lit of the alarm lamp 131 on the basis of the color of the contact icon IcB that corresponds to the wireless terminal device 102.

When there is no wireless terminal device 102 in which at least one of the contact P1 to the contact P3 is in a closed state, the output controller 13 confirms whether or not there is a wireless terminal device 102 of which the contact P4 having the next-highest priority is in a closed state. When there is a wireless terminal device 102 of which the contact P4 is in a closed state, the output controller 13 determines the color to be lit of the alarm lamp 131 on the basis of the color of the contact icon IcB that corresponds to the wireless terminal device 102.

When there is no wireless terminal device 102 in which at least one of the contacts P1 to P4 is in a closed state, the output controller 13 does not transmit any lighting command to the alarm lamp 131.

<Modification 4 of Lighting Pattern>

The management device 101 according to Modification 4 controls lighting of the alarm lamp 131 on the basis of state information from a wireless terminal device 102 designated in advance among a plurality of wireless terminal devices 102.

FIG. 10 shows Modification 4 of the lighting pattern of the alarm lamp controlled by the management device according to the embodiment of the present disclosure.

With reference to FIG. 10, here, it is assumed that one alarm lamp 131A is associated with three wireless terminal devices 102A, 102B, and 102C, and one alarm lamp 131B is associated with two wireless terminal devices 102D and 102E.

In addition, it is assumed that the wireless terminal device 102A is designated in advance among the three wireless terminal devices 102A, 102B, and 102C. It is also assumed that the wireless terminal device 102E is designated in advance among the two wireless terminal devices 102D and 102E. The supervisor can designate any one of the plurality of wireless terminal devices 102 as desired.

(a) Pattern 1

In this case, as in pattern 1, for example, the output controller 13 of the management device 101 controls lighting of the alarm lamp 131A on the basis of the state of the apparatus X that corresponds to the wireless terminal device 102A, irrespective of the state of the apparatus X that corresponds to the wireless terminal device 102B and the state of the apparatus X that corresponds to the wireless terminal device 102C.

Specifically, it is assumed that, on the basis of state information transmitted from the wireless terminal device 102A, the output controller 13 has recognized that the contact P1 and the contact P2 of the wireless terminal device 102A are in a closed state, and the contact P3 and the contact P4 of the wireless terminal device 102A are in an open state.

In this case, the output controller 13 transmits, to the alarm lamp 131A, a lighting command that instructs turning on two lights of red and yellow. Then, on the basis of the lighting command received from the output controller 13, the alarm lamp 131A turns on the two lights of red and yellow.

(b) Pattern 2

As in pattern 2, the output controller 13 controls lighting of the alarm lamp 131B on the basis of the state of the apparatus X that corresponds to the wireless terminal device 102E, irrespective of the state of the apparatus X that corresponds to the wireless terminal device 102D.

Specifically, it is assumed that, on the basis of state information transmitted from the wireless terminal device 102E, the output controller 13 has recognized that all of the contacts P1 to P4 of the wireless terminal device 102E are in an open state. In this case, the output controller 13 determines not to transmit any lighting command to the alarm lamp 131B. Accordingly, the lights in the alarm lamp 131B are in a state of being turned off.

(c) Pattern 3

As in pattern 3, it is assumed that, on the basis of state information transmitted from the wireless terminal device 102A, the output controller 13 has recognized that the contact P3 and the contact P4 of the wireless terminal device 102A are in a closed state and the contact P1 and the contact P2 of the wireless terminal device 102A are in an open state.

In this case, the output controller 13 transmits, to the alarm lamp 131A, a lighting command that instructs turning on two lights of green and blue. Then, on the basis of the lighting command received from the output controller 13, the alarm lamp 131A turns on the two lights of green and blue.

(d) Pattern 4

As in pattern 4, it is assumed that, on the basis of state information transmitted from the wireless terminal device 102E, the output controller 13 has recognized that the contacts P2 to P4 of the wireless terminal device 102E are in a closed state and the contact P1 of the wireless terminal device 102E is in an open state.

In this case, the output controller 13 transmits, to the alarm lamp 131B, a lighting command that instructs turning on three lights of yellow, green, and blue. Then, on the basis of the lighting command received from the output controller 13, the alarm lamp 131B turns on the three lights of yellow, green, and blue.

In the management device 101 according to the embodiment of the present disclosure, the display processing unit 12 sets the color of the representative icon IcA in accordance with the priority of the state of the contact P. However, the present disclosure is not limited thereto. The display processing unit 12 may set a display mode of the representative icon IcA in accordance with the priority of the state of the contact P. Specifically, for example, the display processing unit 12 may change the pattern design, blink speed, shape, or size of the representative icon IcA. In this case, even if the colors of the representative icons IcA are the same, the representative icons IcA can be distinguished from one another.

In the management device 101 according to the embodiment of the present disclosure, in accordance with the states of the contacts P1 to P4, the display processing unit 12 sets the colors of the corresponding icons B1 to B4 included in the contact icon IcB, respectively. However, the present disclosure is not limited thereto. The display processing unit 12 may set, in accordance with the states of the contacts P1 to P4, the display modes of the corresponding icons B1 to B4 included in the contact icon IcB, respectively. Specifically, for example, the display processing unit 12 may change the pattern design, blink speed, shape, or size of the icons B1 to B4. In this case, even if the colors of the icons B1 to B4 are the same, the icons B1 to B4 can be distinguished from one another.

Meanwhile, according to the device described in PATENT LITERATURE 1 above, an abnormality that has occurred in an apparatus can be detected without using manpower. In addition, by a detection result being displayed on a screen, a supervisor can easily and visually understand the abnormality in the apparatus.

However, in an apparatus to be monitored, a plurality of states are sometimes present, such as when an abnormality has occurred in a certain function but another function is operating normally. In such a case, for example, if a display region on a screen is limited, it is difficult to appropriately understand the status of the apparatus.

In contrast, in the management device 101 according to the embodiment of the present disclosure, the acquisition unit 11 acquires, from one or a plurality of wireless terminal devices 102 each having a plurality of contacts P, state information indicating the state of each contact P. In addition, on the basis of the state information acquired by the acquisition unit 11, the display processing unit 12 performs a process of displaying a representative icon IcA representing each wireless terminal device 102. A possible state of each contact P is any one of "closed", "open", and "unconnected". The display processing unit 12 sets a display mode of the representative icon IcA in accordance with the priority of the state of each contact P.

Due to this configuration, even when the respective states of the plurality of contacts P are different, the representative icon IcA is displayed in a mode that corresponds to a state having a high priority.

That is, if a plurality of states of the apparatus X are respectively associated with the states of a plurality of contacts P, it is possible to display the representative icon IcA in a mode according to a state having a high priority that the supervisor should be notified of, among the plurality of states of the apparatus X. Therefore, when a plurality of states have occurred in an apparatus X to be monitored, the status of the apparatus X can be more appropriately understood.

Each contact P of the wireless terminal device 102 according to the embodiment of the present disclosure is provided with a priority. In addition, the display processing unit 12 of the management device 101 sets a display mode of the representative icon IcA in accordance with the priority of the state of the contact P and the priority of the contact P.

Due to this configuration, even when there are a plurality of contacts P that are in the same state, the representative icon IcA is displayed in a mode that corresponds to a contact P that has a high priority among the plurality of contacts P. Accordingly, for example, even when a plurality of abnormalities of different types have occurred in the apparatus X, it is possible to notify the supervisor of the state having a high priority that should be notified of to the supervisor.

In the management device 101 according to the embodiment of the present disclosure, the display processing unit 12 performs a process of displaying, together with the representative icon IcA, a contact icon IcB in a mode indicating the state of each contact P.

Due to this configuration, since information that is not indicated by the representative icon IcA can be notified of by the contact icon IcB, it is possible to notify the supervisor of the specific state of the apparatus X.

In the management device 101 according to the embodiment of the present disclosure, the display processing unit 12 sets the color of the representative icon IcA in accordance with the priority of the state of the contact P.

Due to this configuration, by use of the display color of the representative icon IcA, the supervisor can more appropriately understand the status of the apparatus X.

In the management device 101 according to the embodiment of the present disclosure, the display processing unit 12 performs the process of displaying the contact icon IcB when a predetermined operation has been performed on a representative icon IcA.

Due to this configuration, for example, the contact icon IcB that corresponds only to the apparatus X selected by the supervisor can be displayed, and thus, the display of the screen can be prevented from being complicated.

In the management device 101 according to the embodiment of the present disclosure, on the basis of state information acquired by the acquisition unit 11, the output controller 13 performs an output control of controlling the lighting of the alarm lamp 131 that is associated with a corresponding wireless terminal device 102.

Due to this configuration, in accordance with the state of the apparatus X, both of displaying the representative icon IcA and control of lighting of the alarm lamp 131 can be performed. Thus, the status of the apparatus X can be more assuredly understood.

In the management system 201 according to the embodiment of the present disclosure, an alarm lamp 131 is associated with a plurality of wireless terminal devices 102. In addition, on the basis of corresponding pieces of the state information, the output controller 13 of the management device 101 performs an output control in accordance with the state having the highest priority among the states of the contacts P of each of the plurality of wireless terminal devices 102.

Due to this configuration, if the supervisor confirms the lighting of the alarm lamp 131, the supervisor can comprehensively understand the statuses of the plurality of apparatuses X.

In the management device 101 according to the embodiment of the present disclosure, the output controller 13 performs an output control in accordance with the priorities provided to corresponding ones of the wireless terminal devices 102.

Due to this configuration, even when abnormalities have occurred in a plurality of apparatuses X, the alarm lamp 131 can be turned on in accordance with the state of the apparatus X that corresponds to the wireless terminal device 102 having a high priority.

In the management device 101 according to the embodiment of the present disclosure, the output controller 13 performs an output control in accordance with the priorities provided to the respective contacts P of corresponding ones of the wireless terminal devices 102.

Due to this configuration, even when abnormalities have occurred in a plurality of apparatuses X, the alarm lamp 131 can be turned on in accordance with the state of an apparatus X that is in a state having a high priority that should be notified of.

In the management device 101 according to the embodiment of the present disclosure, the output controller 13 performs an output control on the basis of the state information of a wireless terminal device 102 designated in advance among corresponding ones of the wireless terminal devices 102.

Due to this configuration, even when a plurality of wireless terminal devices 102 are associated with one alarm lamp 131, the supervisor can more assuredly understand the status of the apparatus X that corresponds to the designated wireless terminal device 102.

In the management system 201 according to the embodiment of the present disclosure, each wireless terminal device 102 has a plurality of contacts P, and transmits state information indicating the state of each contact P. The management device 101 receives the state information transmitted from the wireless terminal device 102, and performs a process of displaying a representative icon IcA representing the wireless terminal device 102, on the basis of the received state information. The possible state of each contact P is any one of "closed", "open", and "unconnected". The management device 101 sets a display mode of the representative icon IcA in accordance with the priority of the state of each contact P.

Due to this configuration, even when the respective states of the plurality of contacts P are different, the representative icon IcA is displayed in a mode that corresponds to a state having a high priority.

That is, if a plurality of states of the apparatus X are respectively associated with the states of a plurality of contacts P, it is possible to display the representative icon IcA in a mode according to a state having a high priority that the supervisor should be notified of, among the plurality of states of the apparatus X. Therefore, when a plurality of states have occurred in an apparatus X to be monitored, the status of the apparatus X can be more appropriately understood.

In the management method according to the embodiment of the present disclosure, first, the management device 101 acquires, from one or a plurality of wireless terminal devices 102 each including a plurality of contacts P, state information indicating the state of each contact P. Next, on the basis of the acquired state information, the management device 101 performs a process of displaying a representative icon IcA representing each wireless terminal device 102. The possible state of the contact P is any one of "closed", "open", and "unconnected". When performing the process of displaying the representative icon IcA, the management device 101 sets a display mode of the representative icon IcA in accordance with the priority of the state of the contact P.

Due to this method, even when the respective states of the plurality of contacts P are different, the representative icon IcA is displayed in a mode that corresponds to a state having a high priority.

That is, if a plurality of states of the apparatus X are respectively associated with the states of a plurality of contacts P, it is possible to display the representative icon IcA in a mode according to a state having a high priority that the supervisor should be notified of, among the plurality of states of the apparatus X. Therefore, when a plurality of states have occurred in an apparatus X to be monitored, the status of the apparatus X can be more appropriately understood.

Part or all the functions of the management device 101 according to the embodiment of the present disclosure may be provided through cloud computing. That is, the management device 101 according to the embodiment of the present disclosure may be implemented by servers or the like of a plurality of cloud providers.

The above embodiment is to be considered in all aspects illustrative and not restrictive. The scope of the present disclosure is indicated by the appended claims rather than by the above description, and all changes which come within the meaning and the range of equivalency of the claims are intended to be included therein.

The above description includes the features in the additional notes below.

[Additional Note 1]

A management device comprising:

an acquisition unit configured to acquire, from one or a plurality of wireless terminal devices each having a plurality of contacts, state information indicating a state of each contact; and a display processing unit configured to perform, on the basis of the state information acquired by the acquisition unit, a process of displaying a representative icon representing each wireless terminal device, wherein a possible state of the contact is any one of "closed", "open", and "unconnected", the display processing unit sets a color of the representative icon in accordance with a priority of the state of the contact, the wireless terminal device is mounted to a corresponding apparatus, four of the contacts are provided, the four contacts are respectively associated with a state where a significant abnormality has occurred in the apparatus, a state where an abnormality of a relatively low level has occurred in the apparatus, a state where work onto the apparatus is requested, and a state where the apparatus is not operating, and a closed state and an open state of each of the four contacts are set in accordance with whether or not a corresponding state is present in the apparatus.

[Additional Note 2]

A management system comprising:

one or a plurality of wireless terminal devices each having a plurality of contacts, and each being configured to transmit state information indicating a state of each contact; and a management device configured to receive the state information transmitted from each wireless terminal device, and to perform, on the basis of the received state information, a process of displaying a representative icon representing the wireless terminal device, wherein a possible state of the contact is any one of "closed", "open", and "unconnected", the management device sets a color of the representative icon in accordance with a priority of the state of the contact, the management system further comprises a sensor, an information processing unit, a controller, and a plurality of switches, the plurality of contacts are respectively connected to the plurality of switches, the information processing unit detects, on the basis of a measurement result by the sensor, an abnormality having occurred in the apparatus and outputs a detection result to the controller, and on the basis of the detection result received from the information processing unit, the controller controls the plurality of switches to set states of the contacts.

REFERENCE SIGNS LIST 11 acquisition unit
12 display processing unit
13 output controller
21 sensor
22 information processing unit
23 controller
31 communication unit
101 management device
102 wireless terminal device
121 access point
131 alarm lamp (output device)
201 management system
P1 to P4 contact
SW1 to SW4 switch
X apparatus

The invention claimed is:

1. A management device comprising:

a receiver configured to acquire, from a wireless terminal device having a plurality of contacts and connected to a single apparatus, a plurality of pieces of state information indicating a state of each of the contacts; and a display processor configured to perform, on the basis of the plurality of pieces of the state information acquired by the receiver, a process of displaying a representative icon representing a state of the apparatus, wherein each of the contacts has two terminals corresponding to a switch in the apparatus, a plurality of states of the contacts include a closed state, an open state and an unconnected state of the switch in accordance with a state of the apparatus determined in advance, and the display processor sets a display mode of the representative icon in accordance with a priority determined in advance for each of the closed state, the open state and the unconnected state of the contacts.

2. The management device according to claim 1, wherein each of the contact is provided with a priority, and
the display processor sets the display mode of the representative icon further in accordance with the priority of the contacts.

3. The management device according to claim 1, wherein the display processor performs a process of displaying, together with the representative icon, a contact icon in a mode indicating the state of each of the contacts.

4. The management device according to claim 1, wherein the display processor sets a color of the representative icon in accordance with the priority determined in advance for each of the closed state, the open state and the unconnected state of the contacts.

5. The management device according to claim 3, wherein the display processor performs the process of displaying the contact icon when a predetermined operation has been performed on the representative icon.

6. The management device according to claim 1, further comprising
an output controller configured to perform, on the basis of the state information acquired by the receiver, an output control of controlling an output content of an output device associated with a corresponding one of the wireless terminal devices.

7. The management device according to claim 6, wherein the output device is associated with a plurality of the wireless terminal devices, and
on the basis of corresponding pieces of the state information, the output controller performs the output control in accordance with a state having a highest priority among the states of the contacts of each of the plurality of wireless terminal devices.

8. The management device according to claim 6, wherein the output device is associated with a plurality of the wireless terminal devices, and
the output controller performs the output control in accordance with priorities provided to corresponding ones of the wireless terminal devices.

9. The management device according to claim 6, wherein the output device is associated with a plurality of the wireless terminal devices, and
the output controller performs the output control in accordance with priorities provided to the respective contacts of corresponding ones of the wireless terminal devices.

10. The management device according to claim 6, wherein
the output device is associated with a plurality of the wireless terminal devices, and
the output controller performs the output control on the basis of the state information of a wireless terminal device designated in advance among corresponding ones of the wireless terminal devices.

11. A management system comprising:
a wireless terminal device having a plurality of contacts and connected to a single apparatus, and being configured to transmit a plurality of pieces of state information indicating a state of each of the contacts; and
a management device configured to receive the plurality of pieces of the state information transmitted from the wireless terminal device, and to perform, on the basis of the received plurality of pieces of the state information, a process of displaying a representative icon representing a state of the apparatus, wherein
each of the contacts has two terminals corresponding to a switch in the apparatus,
a plurality of states of the contacts include a closed state, an open state and an unconnected state of the switch in accordance with a state of the apparatus determined in advance, and
the management device sets a display mode of the representative icon in accordance with a priority determined in advance for each of the closed state, the open state and the unconnected state of the contacts.

12. A management method to be performed in a management device,
the management method comprising:
acquiring, from a wireless terminal device having a plurality of contacts and connected to a single apparatus, a plurality of pieces of state information indicating a state of each of the contacts; and
performing, on the basis of the acquired plurality of pieces of the state information, a process of displaying a representative icon representing a state of the apparatus, wherein
each of the contacts has two terminals corresponding to a switch in the apparatus,
a plurality of states of the contacts include a closed state, an open state and an unconnected state of the switch in accordance with a state of the apparatus determined in advance, and
in the step of performing the process of displaying the representative icon, a display mode of the representative icon is set in accordance with a priority determined in advance for each of the closed state, the open state and the unconnected state of the contacts.

13. A non-transitory computer readable storage medium storing a management program to be used in a management device, the management program causing a computer to function as:
a receiver configured to acquire, from a wireless terminal device having a plurality of contacts and connected to a single apparatus, a plurality of pieces of state information indicating a state of each of the contacts; and
a display processor configured to perform, on the basis of the plurality of pieces of the state information acquired by the receiver, a process of displaying a representative icon representing each a state of the apparatus, wherein
each of the contacts has two terminals corresponding to a switch in the apparatus,
a plurality of states of the contacts include a closed state, an open state and an unconnected state of the switch in accordance with a state of the apparatus determined in advance, and
the display processor sets a display mode of the representative icon in accordance with a priority determined in advance for each of the closed state, the open state and the unconnected state of the contacts.

* * * * *